(12) United States Patent
Melsa (10) Patent No.: US 12,479,495 B2
(45) Date of Patent: Nov. 25, 2025

(54) STEERING COLUMN FOR A MOTOR VEHICLE

(71) Applicants: thyssenkrupp Presta AG, Eschen (LI); thyssenkrupp AG, Essen (DE)

(72) Inventor: Philip Melsa, Dornbirn (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 19/039,864

(22) Filed: Jan. 29, 2025

(65) Prior Publication Data

US 2025/0242852 A1 Jul. 31, 2025

(30) Foreign Application Priority Data

Jan. 29, 2024 (DE) ...................... 10 2024 102 468.2

(51) Int. Cl.
*B62D 1/181* (2006.01)
(52) U.S. Cl.
CPC .................................... *B62D 1/181* (2013.01)
(58) Field of Classification Search
CPC ....................................................... B62D 1/181
See application file for complete search history.

(56) References Cited

U.S. PATENT DOCUMENTS 6,688,645 B2 * 2/2004 Andonian ............... B62D 5/001
180/6.26
6,896,089 B2 * 5/2005 Mills ...................... B62D 5/001
180/402

(Continued)

FOREIGN PATENT DOCUMENTS

DE 100 17 049 C2 11/2000
DE 10 2017 206 276 10/2018
(Continued)

*Primary Examiner* — Jason D Shanske
*Assistant Examiner* — Joselynn Y Sliteris
(74) *Attorney, Agent, or Firm* — thyssenkrupp North America, LLC (57) ABSTRACT

A steering column for a motor vehicle comprises an axially extending steering shaft which is mounted in a steering column housing so as to be rotatable about a longitudinal axis, and a revolution limiter for delimiting the rotation of the steering shaft relative to the steering column housing, wherein the revolution limiter has a driver which is connected to the steering shaft, a housing which is connected to the steering column housing and an activation member which is operatively disposed between the driver and the housing and is twistable relative to the steering shaft and relative to the housing, and an activation projection that is able to impact a driver projection of the driver in the circumferential direction, and a detent projection which is able to impact a housing projection of the housing in the circumferential direction. In order to enable a larger rotating angle in a compact construction mode, the invention proposes that the detent projection and the housing projection project so as to be directed axially towards one another, and the activation member is displaceable relative to the steering shaft axially between a detent position and a pass position, wherein disposed between the driver and the activation member is an axially acting lifting device which is designed to move the activation member axially between the detent position and the pass position.

13 Claims, 5 Drawing Sheets

(56) References Cited

U.S. PATENT DOCUMENTS

| | | | | |
|---|---|---|---|---|
| 9,731,681 B2* | 8/2017 | Behrens | ................. | B60R 25/02 |
| 10,578,184 B2* | 3/2020 | Gilbert | ................. | B60G 17/016 |
| 11,014,594 B2* | 5/2021 | Forte | .................... | B62D 1/166 |
| 11,059,513 B2* | 7/2021 | Forte | ........................ | B62D 1/16 |
| 11,801,886 B2* | 10/2023 | Büker | .................... | B62D 5/001 |
| 12,030,549 B2* | 7/2024 | Rist | ........................ | B62D 1/184 |
| 2020/0070871 A1* | 3/2020 | Du | .................... | B62D 15/0215 |
| 2024/0425103 A1* | 12/2024 | Büker | .................... | B62D 5/001 |

FOREIGN PATENT DOCUMENTS

| | | |
|---|---|---|
| DE | 10 2019 120 205 A1 | 1/2021 |
| DE | 10 2021 206 069 A1 | 12/2022 |
| DE | 10 2021 213 947 A1 | 6/2023 |

\* cited by examiner

STEERING COLUMN FOR A MOTOR VEHICLE

CROSS REFERENCE TO RELATED APPLICATION

This application is a U.S. Non-Provisional that claims priority to German Patent Application No. DE 10 2024 102 468.2, filed Jan. 29, 2024, the entire content of which is incorporated herein by reference.

FIELD

The present disclosure relates to a steering column for a motor vehicle, comprising an axially extended steering shaft which is mounted in a steering column housing so as to be rotatable about a longitudinal axis. A steering column of this type, having a revolution limiter, can preferably be used in a steer-by-wire steering system of a motor vehicle.

BACKGROUND

A generic steering column has a steering column housing which, depending on the construction mode, is also referred to as a casing unit or a guide box, in which the steering shaft or steering spindle is mounted so as to be rotatable about its longitudinal axis. The steering column housing can be held by a support unit which is able to be fixedly connected, in most instances so as to be adjustable, to the body of the vehicle.

A steering wheel, which can be rotated about the longitudinal axis by the driver in order to manually input steering commands, is attached as a manual steering handle at the rear end of the steering shaft so as to be proximal to the driver. The rotation of the steering shaft is converted into a steering angle of the steerable wheels of the motor vehicle. While the steering shaft in a conventional steering system is mechanically connected to the wheels by way of the steering gear, the rotation of the steering shaft in a steer-by-wire steering system is detected by means of electronic sensors and converted into an electrical control signal for activating electrical steering actuators which generate a steering angle of the steerable wheels.

Owing to the mechanical coupling to the steerable wheels, which is absent in a steer-by-wire steering system, the rotation of the steering shaft is not delimited by the mechanical end stop of the wheels or of the steering gear when the mechanically maximum possible steering angle has been reached. In order to nevertheless avoid an excessive steering angle and to also simulate a realistic steering sensation, it is known to restrict the maximum possible rotation angle of the steering wheel, and thus of the steering shaft, by means of a rotation limiter so as to delimit the maximum possible rotation of the steering shaft relative to the steering column housing.

A steering column having a revolution limiter of the type mentioned at the outset is known, for example, from DE 10 2019 120 205 A1. The revolution limiter has a driver which is attached to the steering shaft and has a radially outwardly projecting driver projection which can impact on the radially inwardly projecting activation projection of the activation member in the circumferential direction, as a result of which the rotation of the steering shaft relative to the activation member is delimited to <360°. As a result, the activation member, conjointly with the steering shaft, can be twisted relative to the stationary housing until said activation member by way of a radially outwardly projecting detent projection impacts a radially inwardly projecting housing projection in the circumferential direction, as a result of which the rotation of the activation member relative to the steering column housing is delimited to <360°. Correspondingly, the maximum possible rotation of the steering shaft relative to the steering column housing is in any case restricted to a rotation angle of <720°.

The known revolution limiter does indeed enable an advantageous construction mode; however, it is disadvantageous that a rotation of the steering shaft of more than 720°, usually of 900°, required in steer-by-wire steering columns cannot be implemented. Non-generic revolution limiters which operate according to other functional principles and permit a larger rotation angle are indeed known, but they are complex and voluminous.

Thus a need exists to enable a larger rotation angle in a compact construction mode.

BRIEF DESCRIPTION OF THE FIGURES

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a steering column for a motor vehicle, comprising an axially extended steering shaft which is mounted in a steering column housing so as to be rotatable about a longitudinal axis, and a revolution limiter for delimiting the rotation of the steering shaft relative to the steering column housing, wherein the revolution limiter has a driver which is connected to the steering shaft, a housing which is connected to the steering column housing, and an activation member which is operatively disposed between the driver and the housing and is twistable relative to the steering shaft and relative to the housing, and an activation projection which is able to impact the driver projection of the driver in the circumferential direction, and a detent projection which is able to impact a housing projection of the housing in the circumferential direction.

In a steering column for a motor vehicle, comprising an axially extending steering shaft which is mounted in a steering column housing so as to be rotatable about a longitudinal axis, and a revolution limiter for delimiting the rotation of the steering shaft relative to the steering column housing, wherein the revolution limiter has a driver which is connected to the steering shaft, a housing which is connected to the steering column housing, and an activation member which is operatively disposed between the driver and the housing and is twistable relative to the steering shaft and relative to the housing, and an activation projection which is able to impact a driver projection of the driver in the circumferential direction, and a detent projection which is able to impact a housing projection of the housing in the circumferential direction, it is provided according to the invention that the detent projection and the housing projection project so as to be directed axially towards one another, and the activation member is displaceable relative to the steering shaft axially between a detent position and a pass position, wherein disposed between the driver and the activation member is an axially acting lifting device which is designed to move the activation member axially between the detent position and the pass position. In the detent position, the detent projection is able to impact the housing projection in the circumferential direction. In the pass position, the detent projection is able to be moved past the housing projection in the circumferential direction.

The activation member is operatively disposed so as to transmit the impact force between the driver and the housing. Said activation member has an activation element which according to the invention is designed as an axially projecting activation projection. When viewed from the driver, a driver projection projecting axially towards the activation member, during a relative rotation in the circumferential direction, can impact the activation projection in such a way that the activation member is conjointly rotated by the driver, i.e. activated by the latter.

The activation member furthermore has a detent element which according to the invention is designed as an axially projecting detent projection which preferably projects axially on the same side as the activation projection. When viewed from the housing, at least one housing projection which is stationary relative to the steering column housing projects axially towards the activation member.

According to the invention, the activation member can be displaced axially relative to the housing, wherein said activation member in a pass position is axially spaced apart from the housing projection so far that the detent projection can pass the latter in the circumferential direction, i.e. in other words can be moved past the latter without impacting thereon. In other words, the rotation of the activation member relative to the housing is not delimited by a detent in the pass position.

The activation member can be adjusted between the aforementioned pass position and the detent position by means of the lifting device according to the invention. In the process, said activation member is moved from the pass position axially towards the housing until the detent projection plunges axially into the movement cross section of the housing projection that revolves in the circumferential direction in such a way that the detent projection and the housing projection overlap and are coupled in a detent engagement in such a manner that they can impact one another in the circumferential direction. As a result, the rotation angle of the activation member is delimited relative to the housing in the detent position.

The activation member can be moved away from the housing in the axial direction by a reverse activation of the lifting device, as a result of which said activation member is moved from the detent position into the pass position, or in other words the activation member is decoupled from the housing.

In the pass position, the activation member and thus also the driver, which is connected by the impact between the driver projection and the activation projection, can be freely rotated relative to the housing. A rotational limitation can be activated in that the lifting device moves the activation member axially into the detent position. As a result, the rotation of the driver, which within the activation member is delimited in terms of rotation relative to the latter, is also delimited relative to the housing.

One advantage of the invention lies in that the activation member can be selectively brought into detent engagement by the lifting device. In this way, a rotation of the activation member relative to the housing of more than 360° can be implemented in such a way that the rotation of the driver, and thus of the steering shaft relative to the steering column housing, can be delimited to a maximum rotation angle of >720°, for example to an angular range of 900° without problems.

An additional degree of freedom is provided by the axial lifting device, which by coupling and decoupling enables an enlargement of the angular range delimited by the detents and in the prior art mentioned at the outset is fundamentally always smaller than 720° due to the detent elements which are radially fixedly attached to the activation member.

A further advantage lies in that, due to the axially projecting driver, activation, detent and housing projections which engage in one another in the axial direction, a compact construction mode can be implemented, in particular a smaller construction diameter, than in the case of the activation member which in the prior art is inserted radially between the driver and the housing.

It can preferably be provided that the activation member has a disc-shaped main body from which the activation projections and detent projections project axially on one side. A compact construction mode is enabled as a result.

The driver having the at least one driver projection can preferably be disposed coaxially within the housing projection. Here, the driver projection has a smaller radial spacing from the longitudinal axis than the housing projection.

The axial displacement according to the invention can be implemented in that the activation member is mounted so as to be displaceable in the axial direction on the steering shaft, for example by being mounted by a plain bearing. The mounting preferably also enables a rotation relative to the driver in order to enable the detent in the circumferential direction. This rotating movement can be integrated into the plain bearing.

It is preferably provided that the lifting device is designed to convert twisting of the driver relative to the activation member into axial lifting of the activation member. As a result of relative twisting of the driver about the longitudinal axis relative to the activation member, the lifting device can generate an axial movement of the activation member, specifically—depending on the rotation direction—from the detent position directed axially away from the housing into the pass position, or conversely directed axially towards the housing for coupling into the detent position. For example, the lifting device can be implemented by a lifting gear which is designed for converting a rotating movement into an axial lift. As a result, the advantage can be achieved that the lifting device is automatically activated by twisting the steering shaft when inputting manual steering commands, in order to couple or decouple the activation member and to in this way implement a revolution limitation enhanced according to the invention.

One advantageous embodiment can be implemented in that the lifting device has a link disc which is connected to the driver and has at least one guide track that extends in the circumferential direction, is inclined relative to the longitudinal axis and interacts with the activation projection. The guide track, which can synonymously also be referred to as the link track, when viewed from the driver projection of the driver, ascends in the circumferential direction, i.e. when viewed from the driver is directed axially away. The activation projection of the activation member bears axially on the guide track and can slide along the latter during a rotation relative to the driver in the circumferential direction. As a result, the activation member is moved away from the driver when the activation projection slides upwards on the ascending guide track, and the activation member can be adjusted into the pass position as a result. A lifting device of this type enables a simple reliable construction which can be implemented in a compact manner.

In the aforementioned embodiment it is possible that the guide track, when viewed from a driver projection, ascends in the circumferential direction from a first engagement portion into a release portion, and descends from the release portion into a second engagement portion. In the region of the first engagement portion, which can be axially moulded in the driver and preferably is adjacent to the driver projection, the activation projection has approached the driver axially, and the detent projection is positioned in an axial detent position. When the activation projection slides on the ascending guide track into the release portion as a result of the rotation of the driver, the activation member is displaced axially into the pass position. When the activation projection subsequently slides further in the circumferential direction, said activation member makes its way from the release portion into a second engagement portion which can preferably be moulded axially as far into the driver as the first engagement portion, so that a detent portion is reassumed. In this way, the activation member during a rotation of the steering shaft can carry out a type of axial wave movement during relative twisting in relation to the driver, in which axial wave movement said activation member is moved axially out of the detent position into the pass position and back again.

It is advantageous that the guide track extends between two driver projections which are opposite one another in terms of the longitudinal axis. An advantageous symmetrical arrangement in which the activation forces arising during operation are uniformly distributed can be implemented as a result of a substantially diametrical arrangement of the driver projections.

It is preferable that the activation member is preloaded axially in relation to the driver. The preloading force acts axially in such a way that the activation member is pressed axially against the driver in a friction fit. As a result, a friction-fitting torque connection is generated in such a way that the driver during rotation rotationally entrains the activation member. A friction fit between the activation projection and the guide track can preferably be generated, as a result of which a defined sliding contact of the lifting device is advantageously guaranteed.

The aforementioned embodiment can be implemented in that an axially effective spring element is disposed between the activation member and the housing. For example, the spring element can comprise a coil spring, or disc spring, which is disposed coaxially on the steering shaft and is supported axially in relation to the housing and presses the activation member axially against the driver. The spring force generates elastic axial preloading of the activation element in relation to the driver.

It is preferably provided that a friction clutch is formed between the driver and the activation member. The friction clutch has a defined separation torque, also referred to as breakaway torque. During manual rotation of the steering shaft, the activation member is entrained by the driver in a friction-fitting manner and rotated onward until the detent projection impacts on the housing projection. If a manual torque them continues to be exerted, the friction clutch slips and the driver is twisted relative to the activation member. The lifting device can be activated as a result, as has been described further above. A friction clutch of this type can be provided in a simple and reliable manner, and enables automatic coupling and decoupling, as has been explained above.

The friction clutch can preferably be generated by the sliding contact between the activation projection and the guide track. The static friction between the activation member and the driver, which is predefined by the size of the preloading force, determines the maximum possible torque, and can preferably be predefined in order to generate a defined separation torque, or breakaway torque.

One advantageous refinement can provide that attached to the housing are two restoring detents which are disposed on both sides of the housing projection so as to be spaced apart therefrom in the circumferential direction, the detent projection in the pass position being able to impact said restoring detents in the circumferential direction, and the detent projection in the detent position being able to move past said restoring detents in the circumferential direction. The restoring detents have in each case a spacing from the housing projection in the circumferential direction that is at least sized in such a way that the activation projection when transitioning from the detent position into the pass position, and vice versa, is displaceable in the axial direction between a restoring detent and the housing projection. In other words, the width of the spacing measured in the circumferential direction is larger than the width of the activation projection, likewise measured in the circumferential direction. The restoring detents ensure a forced coupling of the lifting device by way of which the activation member during the rotation of the driver relative to the housing can be moved automatically from the detent position into the pass position and back again, so that axial coupling and decoupling of the activation member with/from the housing according to the invention can take place, as described above.

In the aforementioned embodiment it is possible that the restoring detents project radially inwards so as to be axially spaced apart from the housing projection.

It is advantageous that the activation member has two activation projections which are opposite one another in terms of the longitudinal axis. A symmetrical arrangement which is favourable in terms of the distribution of force and torque can be formed as a result.

It is advantageous that the activation member has two detent projections which are opposite one another in terms of the longitudinal axis. A symmetrical arrangement which is favourable in terms of the distribution of force and torque can be formed as a result.

It is advantageous that the housing has two housing projections which are opposite one another in terms of the longitudinal axis. A symmetrical arrangement which is favourable in terms of the distribution of force and torque can be formed as a result.

It is preferable that the steering column is designed as a steer-by-wire steering column. Steer-by-wire steering systems, which do not have any mechanical connection to the steering handle and the steering shaft with the steerable wheels, convert manual-input steering commands into electrical control signals which actuate the steering drive in a purely electrical manner. Provided for this purpose are electrical rotation sensors which detect the rotation angle and preferably also the torque of any manual steering input and are converted into electrical control signals which are utilized for activating electric steering actuators.

Identical parts are at all times provided with the same reference signs in the various figures, and are therefore typically also identified or mentioned only once in each case.

Figure 1:
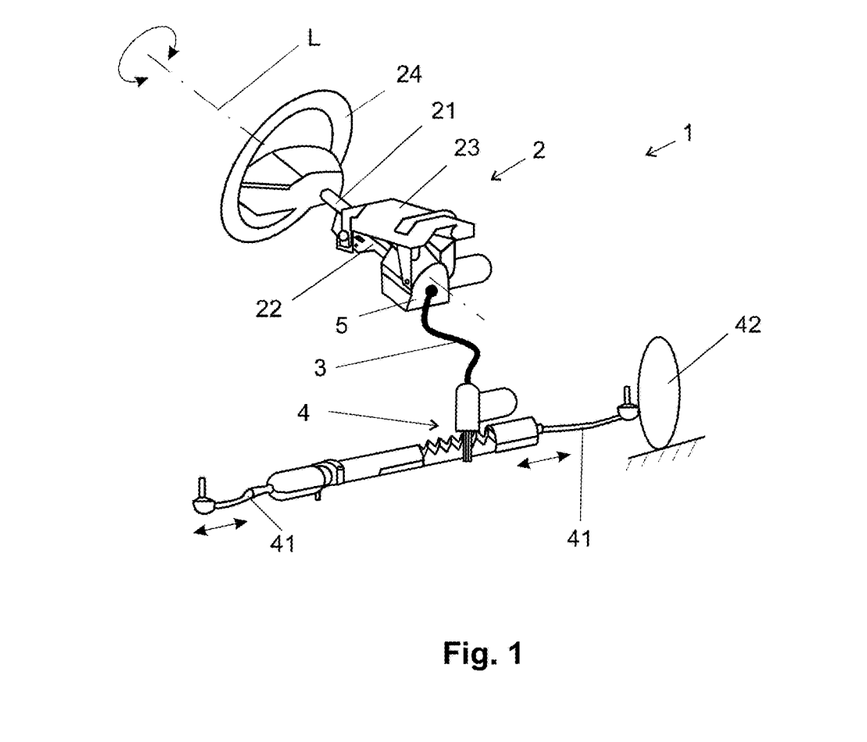
FIG. 1 shows a schematic illustration of a steer-by-wire steering system.

FIG. 1 shows a steering system 1 which is designed as a steer-by-wire steering system for a motor vehicle and comprises a steering column 2 according to the invention.

The steering column 2 has a steering shaft 21, also referred to as steering spindle, which is mounted so as to be rotatable about its longitudinal axis L, extending in the longitudinal direction, relative to a casing unit 22 that is held by a support unit 23. The latter is able to be attached to a vehicle body not illustrated here.

A steering wheel 24 as a manual steering input means is attached to that end of the steering shaft 21 that is at the rear in the travel direction and faces the driver position.

A steering command which is manually input by way of the steering wheel 24 as a rotation of the steering shaft 21 is converted, by rotation sensors not illustrated here, into electrical control signals which by way of the control line 3 can activate an electromotive steering actuator 4. As shown by way of example here, the latter, as a function of the control signals, can generate a mechanical steering angle of steerable wheels 42 by displacing tie rods 41, as is indicated by the double arrows.

For delimiting the maximum rotation angle of the steering shaft 21 relative to the casing unit 22, the steering column 2 has a revolution limiter 5 according to the invention.

Figure 2:
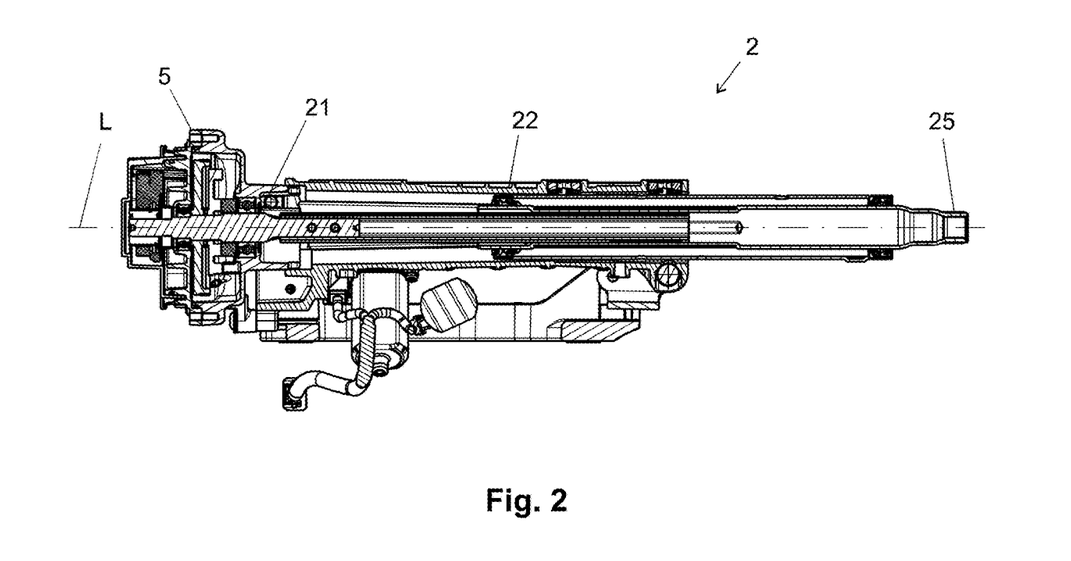
FIG. 2 shows a longitudinal section through the steering column of the steering system according to FIG. 1.

FIG. 2 shows a longitudinal section along the longitudinal axis L through the steering column 2, wherein the fastening portion 25 for attaching the steering wheel 24, not shown here, points towards the right. Illustrated in FIG. 3 is an enlarged detailed view from FIG. 2, which is attached to the steering column 2 in the front region, on the left in FIG. 2.

Figure 3:
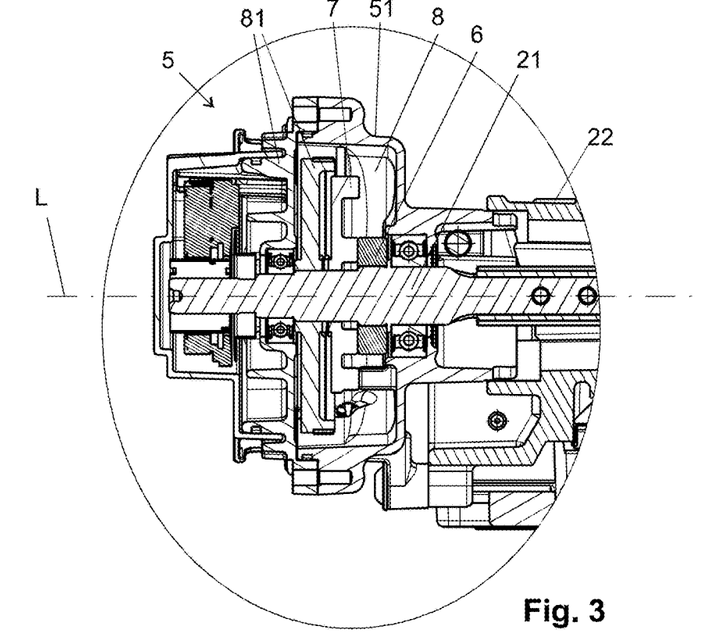
FIG. 3 shows an enlarged partial view from FIG. 2.
Figure 4:
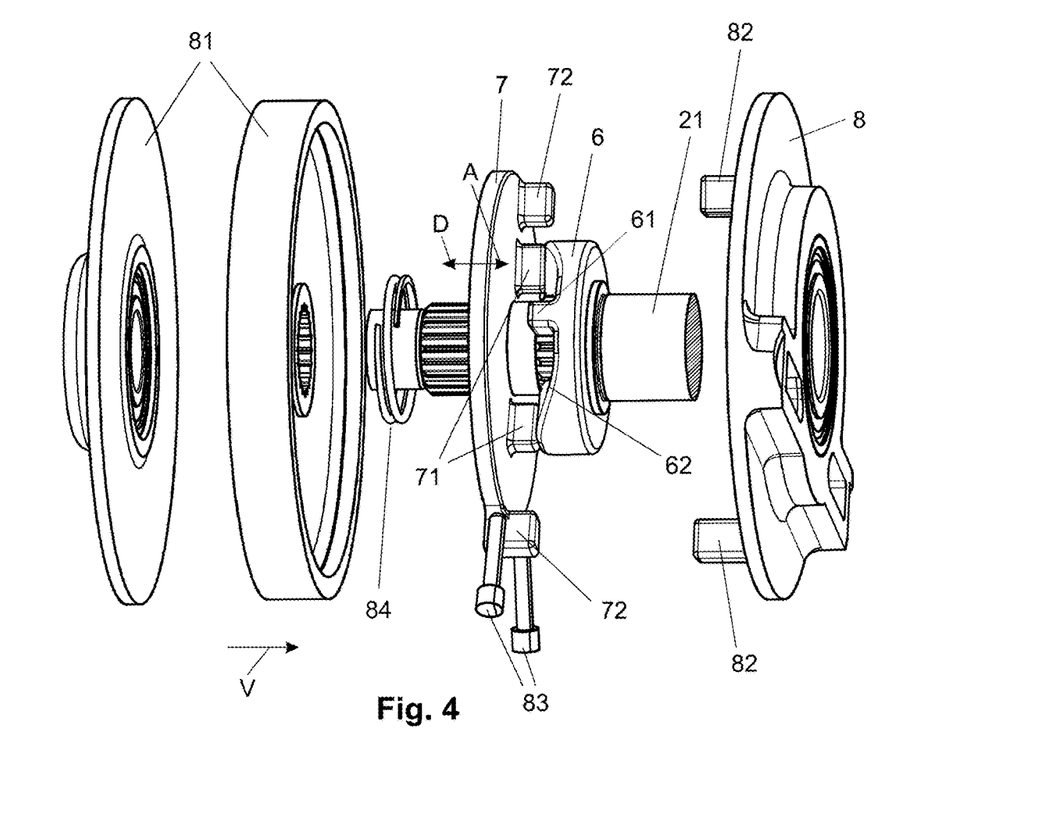
FIG. 4 shows a schematically exploded illustration of the revolution limiter according to the invention of the steering column according to FIGS. 2 and 3.

FIG. 4 shows an exploded illustration in which the substantial components of the revolution limiter 5 according to FIG. 3 are schematically pulled apart in the direction of the longitudinal axis L.

The revolution limiter 5 comprises a driver 6, an activation member 7 and the housing 8.

The driver 6 is fixed co-rotationally and axially, i.e. in the direction of the longitudinal axis L, on the steering shaft 21. Said driver 6 has driver projections 61 which project axially towards the activation member 7, towards the left in FIG. 4, between which are formed axial guide tracks 62 (disc tracks) which run so as to be inclined in the circumferential direction. Accordingly, the driver 6 forms a link disc, or has such a link disc.

The activation member 7 has a disc-shaped main body which is disposed coaxially in relation to the longitudinal axis L and is mounted on the steering shaft 21 by way of a plain bearing, specifically so as to be axially displaceable relative to the driver 6, between a pass position D and a detent position A, as is illustrated by the double arrow, and mounted so as to be rotatable relative to the driver 6 about the longitudinal axis L.

Two activation projections 71 project from the activation member 7 so as to be directed axially towards the driver 6. Said activation projections 71 can impact the driver projections 61 in the circumferential direction, and rest axially on the guide tracks 62 on which the said activation projections 71 can slide along in the circumferential direction. The activation projections 71, conjointly with the guide tracks 62, form a lifting device according to the invention, which generates an axial lift, i.e. an axial adjustment of the activation member 7 relative to the driver 6 during a relative rotation of the driver 6 and the activation member 7. Depending on the relative rotation direction, an adjustment of the activation member 7 can take place from the pass position D into the detent position A, or vice versa.

The housing 8 has further housing parts 81 which are attached so as to be at least axially fixed relative to a limiter housing 51 that encloses the revolution limiter 5. The housing 8 comprises two axially projecting housing projections 82 which are directed towards the activation member 7 and correspond to two detent projections 72 that project axially from the activation member 7. The detent projections 72 and the housing projections 82 here are sized and disposed in such a way that they can impact one another in the circumferential direction in the detent position A of the activation member 7, and can pass one another in the circumferential direction in the pass position D so that the activation member 7 can be rotated onward without impacting thereon.

Furthermore, two restoring detents 83 are fixed relative to the housing 8. The former are sized and disposed in each case at a spacing in the circumferential direction on both sides of the one housing projection 82 in such a manner that the one detent projection 72 in the axial direction is able to be moved through between the housing projection 82 and the restoring detent 83, wherein this detent projection 72 is able to impact on the restoring detents 83 only in the pass position D of the activation member 7. In the detent position A, the detent projection 72 can be moved past the restoring detents 83 in the circumferential direction.

An axially effective spring element 84, which in the example is formed by a coil spring disposed coaxially on the steering shaft 21, and which presses the activation member 7 axially against the driver 6 in a friction-fitting manner, is inserted between the housing part 81 and the activation member 7. Specifically, the activation projections 71 are elastically held in frictional contact, or sliding contact, axially by the guide tracks 62 by way of the spring force.

Shown in FIGS. 5 to 10 is a schematic view, seen obliquely to the longitudinal axis L, onto the housing 8 in various successive angular adjustments, specifically approximately in the viewing direction V indicated in FIG. 4. The disc-shaped main body of the activation member 7 here is omitted for the sake of improved clarity, and only the activation projections 71 and the detent projections 72 are visible in the cross section.

Figure 5:
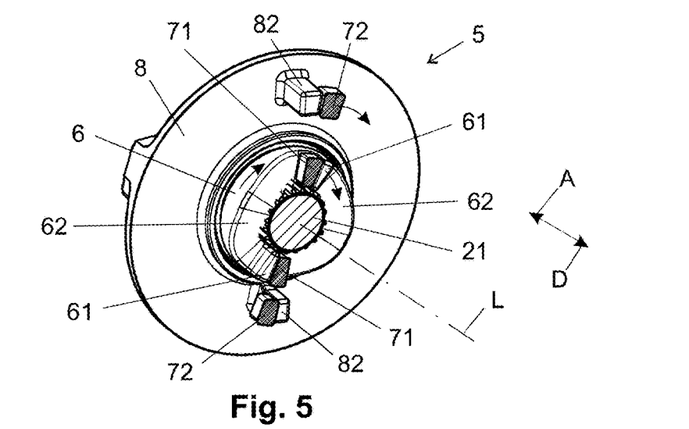
FIG. 5 shows a schematic view of the revolution limiter according to FIG. 4 in a first angular adjustment.
Figure 6:
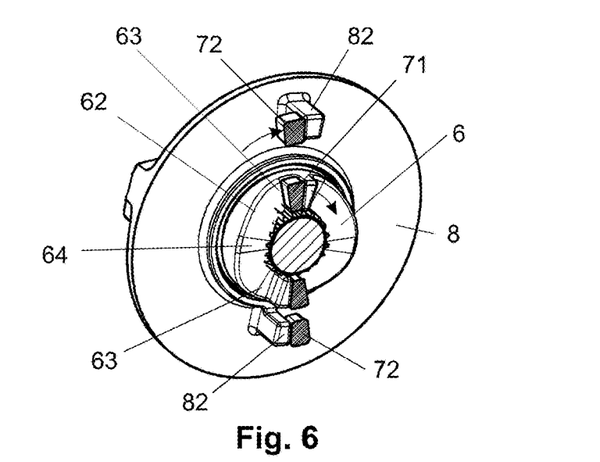
FIG. 6 shows a view analogous to that of FIG. 5, in a second angular adjustment subsequent to the angular adjustment according to FIG. 5.

The guide track 62, which runs in the circumferential direction between the driver projections 61, has first and second engagement portions 63 which are moulded adjacent to the driver projections 61 and from which the guide track 62 ascends up to an intervening, axially projecting release portion 64, see FIG. 6. When the activation projections 61 rest on the guide track in the region of the engagement portions 63, the activation member 7 is situated at the detent position A. If said activation member 7 slides from there into the release portion 64, the activation member 7 is lifted away from the driver 6 axially into the pass position D in which said activation member 7 is axially spaced apart from the housing projection 82. In FIGS. 5 to 11, the pass position D is lifted in the direction of the longitudinal axis L out of the drawing plane towards the viewer, as is indicated by the double arrow in FIG. 5.

FIG. 5 shows the limiting device 5 in a first terminal detent. Proceeding therefrom, the steering shaft 21, conjointly with the driver 6, is rotated in the clockwise direction shown in the illustration. The driver projections 71 rest axially on the guide tracks 62 in a friction-fitting manner. As a result of the friction fit with the driver 6, the activation member 7 is conjointly rotated. In FIG. 5, the detent projections 72 rest on the corresponding housing projections 82 and are released from the detent by the rotation in the clockwise direction.

Figure 7:
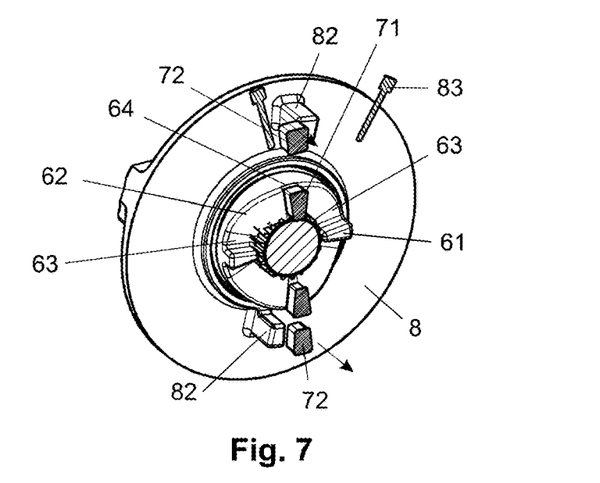
FIG. 7 shows a view analogous to that of FIG. 6, in a third angular adjustment subsequent to the angular adjustment according to FIG. 6.

In FIG. 6, the detent projections 72 impact the housing projections 82 in the circumferential direction, so that the rotation of the activation member 7 relative to the housing 8 is stopped. In the meanwhile, the driver 6 is rotated further in the clockwise direction so that the guide track 62 slides along below the activation portion 71 in the circumferential direction, and the latter makes its way into the axially projecting release portion 64, as is shown in FIG. 7. As a result, the activation member 7 is lifted away from the housing 8, as is indicated by the arrows on the detent projections 72 that are directed out of the drawing plane axially in the direction of the longitudinal axis L towards the bottom right.

Figure 8:
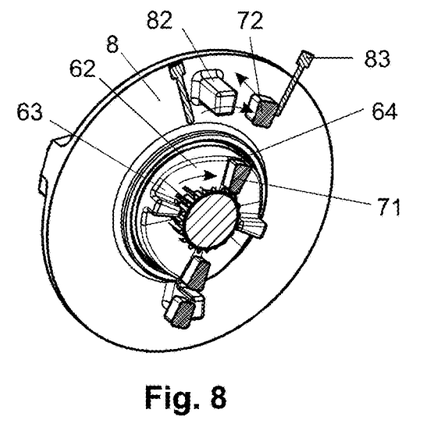
FIG. 8 shows a view analogous to that of FIG. 7, in a fourth angular adjustment subsequent to the angular adjustment according to FIG. 7.

As a result, the activation member 7 is displaced axially into the pass position D, so that the detent projection 72 during the further rotation in the circumferential direction can be moved past the housing projection 82 in such a way that the angular position shown in FIG. 8 is reached.

Figure 9:
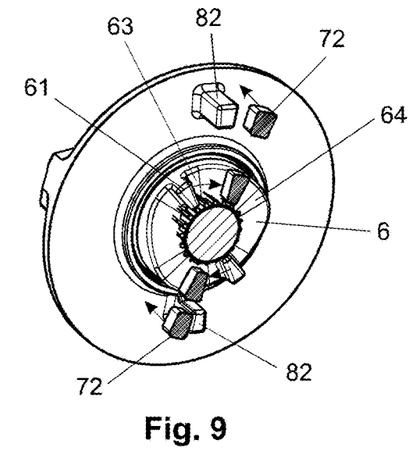
FIG. 9 shows a view analogous to that of FIG. 8, in a fifth angular adjustment subsequent to the angular adjustment according to FIG. 8.

In the process, the detent projection 72, which conjointly with the activation member 7 is in the pass position D, impacts the one restoring detent 83 in the circumferential direction. As a result, the rotation of the activation member 7 relative to the housing 8 is stopped, and the driver 6 is rotated onward in the clockwise direction relative to the activation member 7, as a result of which the activation portion 71 on the guide track 62 slides from the release portion 64 into the second engagement portion 63. This is shown in FIG. 8 and FIG. 9.

Figure 10:
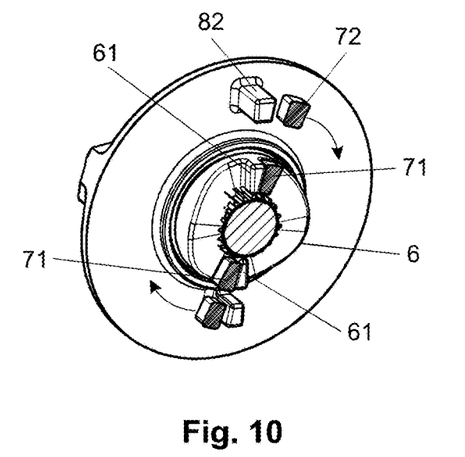
FIG. 10 shows a view analogous to that of FIG. 9, in a sixth angular adjustment subsequent to the angular adjustment according to FIG. 9.

Accordingly, the activation member 7 is displaced from the pass position D axially towards the housing 8 into the detent position A. In the process, the detent projections 72 are pushed axially so as to be directed towards the housing 8, as is plotted by the arrows in FIG. 9. The rotation of the driver 6 relative to the activation member 7 takes place until the driver projections 61 impact the activation projections 71 in the circumferential direction, so that the activation member 7 is conjointly rotated with the driver 6, and the detent projections 72 depart from the housing projections 82 in the circumferential direction, as is shown in FIG. 10.

Figure 11:
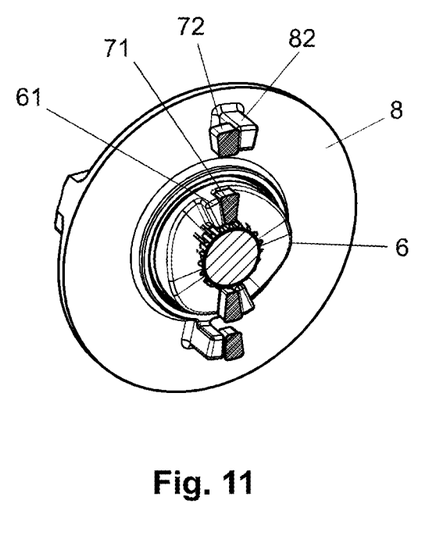
FIG. 11 shows a view analogous to that of FIG. 10, in a seventh angular adjustment subsequent to the angular adjustment according to FIG. 10.

This rotation can be continued until the second terminal detent shown in FIG. 11 is reached. In this state, the detent projections 72 impact the housing projections 82 from the opposite circumferential direction in comparison to FIG. 5, and the driver projections 61 likewise impact the activation projections 71 in the opposite circumferential direction.

Proceeding from the first terminal detent according to FIG. 5, a rotation angle of >720°, for example 900°, can be achieved without problems until the second terminal detent according to FIG. 11 is reached.

In an alternative embodiment not shown here, the driver 6 and activation member 7 can also be embodied in such a way that only one driver projection 61 and one activation projection 71 are in each case present (as opposed to the embodiment described above, having in each case two activation projections and driver projections). In such an alternative embodiment, an even larger rotation angle of up to 1080° can then be implemented.

From the second terminal detent shown in FIG. 11, an opposite rotation of the steering shaft 21 can take place, thus in the counterclockwise direction in the illustration, wherein the mentioned steps are performed in the opposite direction until the rotational position shown in FIG. 5 is reached again.

LIST OF REFERENCE SIGNS

1 Steering system
2 Steering column
21 Steering shaft
22 Casing unit
23 Support unit
24 Steering wheel
25 Fastening portion
3 Control line
4 Steering actuator
41 Tie rod
42 Wheel
5 Revolution limiter
51 Limiter housing
6 Driver
61 Driver projection
62 Guide track
63 Engagement portion
64 Release portion
7 Activation member
71 Activation projection
72 Detent projection
8 Housing
81 Housing part
82 Housing detent
83 Restoring detent
84 Spring element
L Longitudinal axis
D Pass position
A Detent position

The invention claimed is:

1. A steering column for a motor vehicle, comprising:
an axially extending steering shaft which is mounted in a steering column housing so as to be rotatable about a longitudinal axis; and
a revolution limiter for delimiting the rotation of the steering shaft relative to the steering column housing;
wherein the revolution limiter has a driver which is connected to the steering shaft, a housing which is connected to the steering column housing, and an activation member which is operatively disposed between the driver and the housing and is twistable relative to the steering shaft and relative to the housing, and an activation projection which impacts a driver projection of the driver in a circumferential direction, and a detent projection which impacts a housing projection of the housing in the circumferential direction;
wherein the detent projection and the housing projection project so as to be directed axially towards one another and the activation member is displaceable relative to the steering shaft axially between a detent position and a pass position;
wherein disposed between the driver and the activation member is an axially acting lifting device which moves the activation member axially between the detent position and the pass position.

2. The steering column according to claim 1, wherein the lifting device converts twisting of the driver relative to the activation member into axial lifting of the activation member.

3. The steering column according to claim 2, wherein the lifting device has at least one guide track that extends in the circumferential direction, is inclined relative to the longitudinal axis and interacts with the activation projection.

4. The steering column according to claim 3, wherein the at least one guide track, when viewed from a driver projection, ascends in the circumferential direction from a first engagement portion into a release portion, and descends from the release portion into a second engagement portion.

5. The steering column according to claim 4, wherein the at least one guide track extends between two driver projections which are diametrically opposite one another in terms of the longitudinal axis.

6. The steering column according to claim 1, wherein the activation member is preloaded axially in relation to the driver.

7. The steering column according to claim 6, wherein an axially effective spring element is disposed between the activation member and the housing.

8. The steering column according to claim 1, wherein attached to the housing are two restoring detents which are disposed on both sides of the housing projection so as to be spaced apart therefrom in the circumferential direction, the detent projection in the pass position impacts said restoring detents in the circumferential direction, and the detent projection in the detent position moves past said restoring detents in the circumferential direction.

9. The steering column according to claim 8, wherein the restoring detents project radially inwards so as to be axially spaced apart from the housing projection.

10. The steering column according to claim 1, wherein the activation member has two activation projections which are opposite one another in terms of the longitudinal axis.

11. The steering column according to claim 1, wherein the activation member has two detent projections which are opposite one another in terms of the longitudinal axis.

12. The steering column according to claim 1, wherein the housing has two housing projections which are opposite one another in terms of the longitudinal axis.

13. The steering column according to claim 1, wherein the steering column is a steer-by-wire steering column.

* * * * *